Oct. 11, 1932.   J. H. OSMER   1,881,901
PROCESS FOR THE TREATMENT OF HYDROCARBON OILS WITH ALUMINUM CHLORIDE
Filed Dec. 28, 1926
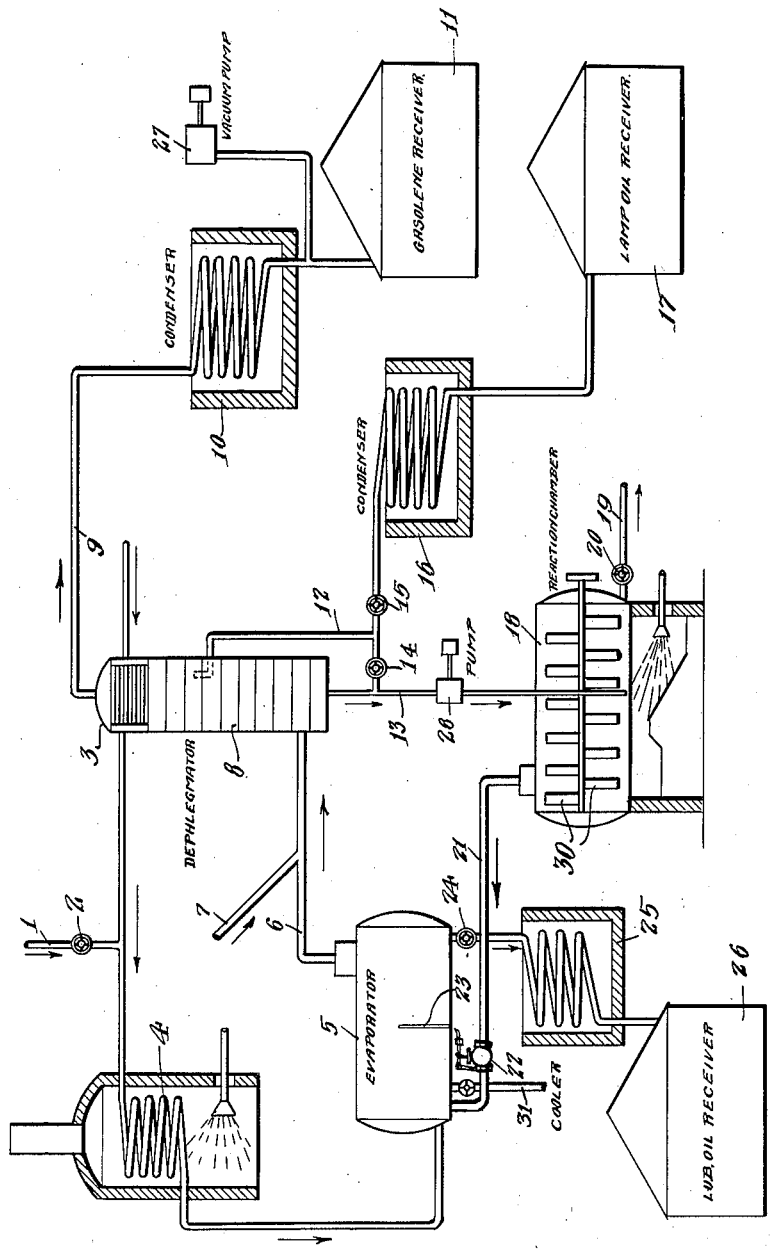
Inventor
James Harold Osmer
By Lyon & Lyon
Attorneys Patented Oct. 11, 1932

1,881,901

UNITED STATES PATENT OFFICE

JAMES HAROLD OSMER, OF EL SEGUNDO, CALIFORNIA, ASSIGNOR TO STANDARD OIL COMPANY OF CALIFORNIA, OF SAN FRANCISCO, CALIFORNIA, A CORPORATION OF DELAWARE

PROCESS FOR THE TREATMENT OF HYDROCARBON OILS WITH ALUMINUM CHLORIDE

Application filed December 28, 1926. Serial No. 157,458.

This invention relates to a process for the purification and conversion of petroleum or related oils by means of anhydrous aluminum chloride or other metallic halides.

More specifically it deals with a process for the continuous or batch treatment of oils of the type mentioned by aluminum chloride in the vapor phase, with the object of purifying the gasoline naturally contained in the oil, or purifying the lubricating oil fractions derived therefrom and of producing low boiling point hydrocarbons from higher boiling point constituents contained in the residuum from the purifying process. The oil treated may be any petroleum oil, oil derived from shale, or oils derived from coal, wood, or similar substances.

As is well known, hydrocarbon oils may be subjected to heat in the presence of anhydrous aluminum chloride for the purpose of producing therefrom low boiling hydrocarbons of a high degree of purity and saturation, or hydrocarbon oils may be contacted with anhydrous aluminum chloride for the purpose of purifying and saturating these hydrocarbons without substantial conversion to low boiling products. In conventional processes which have for their object the production of low boiling from high boiling hydrocarbons, it is necessary to make use of relatively high temperatures with or without pressures above atmospheric. Likewise, when the object is to purify the oil without substantial decomposition, lower temperatures must be used.

The use of aluminum chloride for cracking (i. e., converting high boiling oils to lower boiling oils) is advantageous for several reasons, of which one is the possibility of cracking without the use of excessive pressures or temperatures. Another is the high quality of the products compared with the quality of the products produced by the heat-pressure cracking process. The products obtained from aluminum chloride treatment as a rule require substantially no further refinement. However, there are certain difficulties to be overcome in connection with the economical operation of the aluminum chloride process, whether it be for the purpose of cracking or of purification. Among these difficulties may be mentioned that of obtaining efficient contacting between the hydrocarbon and the aluminum chloride. This difficulty is the result of the fact that aluminum chloride is a solid at temperatures at which purification without conversion takes place and as such is difficult to contact with liquid oil. Even in the vapor state the action between aluminum chloride and hydrocarbons results in the formation of a semi-solid or solid reaction product which separates more or less readily from the body of oil. Nevertheless, contact may be brought about more easily when the aluminum chloride and oil are each in the vapor state, due to the greater ease of commingling vapors and controlling their temperature and time of contact. Another difficulty encountered in the practical use of aluminum chloride is the difficulty of cheaply recovering the halide from the residuum. It it an object of this invention to automatically recover and re-use most of the aluminum chloride from the residuum, and to use the aluminum chloride throughout the system in the most efficient manner possible.

It is an object of this invention to treat an oil which contains appreciable amounts of low boiling oils, such as gasoline, separate said low boiling constituents, and subject them to the purifying action of aluminum chloride without substantial decomposition, subject the heavy residue from this aluminum chloride treatment to conditions favorable to the formation of lighter products such as gasoline, and at the same time subject the oil fractions from which all the lighter products have been removed to the purifying action of aluminum chloride under conditions unfavorable to decomposition. By the use of this process, then, there will be produced a purified gasoline, and a high grade lubricating oil stock, both of which products will be free from all traces of aluminum chloride and heavy aluminum chloride reaction products. The yield of low boiling oils from the charging stock will be substantially increased, and at the same time the amount of aluminum chloride used up in the process will be held at the lowest possible figure. All of these results will be realized by the operation of a single co-ordinated and continuous process.

The invention will be best understood from a description of a preferred process as carried out within the apparatus illustrated in the accompanying drawing.

The drawing is diagrammatic and illustrates only one of several possible methods of carrying out the process described in this invention.

In this drawing 1 represents a pipe line through which oil is fed to the system. This feed is controlled by a valve 2. A part of the feed oil is diverted or by-passed through a closed planer, coil or heat exchanger 3 in the top of the dephlegmating tower. The combined feed stock passes through a coil 4 placed in a heating chamber which may be a separate furnace or a part of the furnace which heats the reaction chamber 18. From the heating coil the oil passes into the evaporator 5, shown in the drawing as a horizontal cylindrical drum. The vapors from the evaporator pass through a vapor line 6 to which is connected a smaller line 7 for the introduction of aluminum chloride vapor under suitable pressure from a source not shown. The commingled oil and aluminum chloride vapors pass into a fractionating tower or dephlegmator 8. This consists of a series of baffle plates, bubble-caps, or any apparatus designed to effect fractionation. Such vapors as are uncondensed in the tower are conducted through the vapor line 9 to a cooling coil 10 where they are condensed and thence to a receiver 11. When it is desired to maintain the vapor fractionating system (evaporator 5, line 6, dephlegmator 8 and condenser 10) under vacuum a suitable vacuum pump 27 is connected to the run down line between the coil 10 and the receiver 11, and exhausts so-called fixed gases at this point. These gases may be discharged from the vacuum pump to the air or to an absorption system. If the vacuum pump is of suitable design it may exhaust into the reaction chamber in order to assist in raising the pressure therein. Ordinarily the reflux from the tower is conducted to a reaction chamber 18 through a reflux line 13. However, in special cases it may be desirable to segregate a part of the refluxed oil, for example, that boiling above the boiling point of aluminum chloride at the pressure prevailing in the tower. In this case, this special cut may be withdrawn through the line 12 to a cooling coil 16, and thence to a receiver 17. The system is made somewhat more flexible by connecting the pipe 12 to the reflux line 13 and installing the valves 14 and 15. In some cases it will be desired to carry a higher pressure on the reaction chamber than is carried on the rest of the system. This will make it necessary to install a pump 28 in the line 13, and a pressure regulating valve 22 in the vapor line 21. The reaction chamber 18 is provided with a suitable stiring device 30 operated mechanically from the outside, and heated by any suitable means such as a combustion furnace as indicated. Residuum from the reaction chamber is drawn off through the line 19, and its flow regulated by the valve 20. Vapors from the reaction chamber pass through the vapor line 21 which empties into the evaporator 5. Vapors of lower boiling oils and metallic halides are separated from the mixture and pass off through line 6; while the heavy reaction products and tarry matters resulting from the purifying action of the metalic halide vapors upon the feed oil are separated from the lubricating oil stock formed by the removal of said lower boiling oils and halide purification products. These heavy reaction products may be periodically or continuously removed as by line 31. This separation of vapor, lubricating oil stock, and heavy reaction products may be assisted by a suitable baffle 23, the heavy reaction products remaining on one side of the baffle while the purified lubricating oil stock which has been formed flows over the baffle 23. Purified lubricating oil stock is continuously withdrawn from the evaporator through a line containing a valve 24, through a cooler 25, into a receiver 26.

As an example of the operation of this process, I may feed a California crude oil to the system. Part of this crude oil feed may pass through the planer 3 as described, i. e., sufficient to bring about the proper dephlegmation at the outlet of the tower.

When the apparatus is being run for the production of approximately 55° A. P. I. gasoline from California crude, the temperature of the vapors at the outlet of the tower will be preferably about 230° F., when the system is under a pressure of $\frac{1}{3}$ atmosphere, i. e., 10 inches of mercury.

The crude feed which is passed through a planer is added to the balance of the feed which may or may not have passed through a heat exchanger and exchange heat with hot residuum from the evaporator or from the reaction chamber. The feed oil in passing through a heating coil 4, as shown, may have its temperature raised somewhat, although the additional temperature required will be quite small because of the contact which the feed stock makes with the hot gases from the reaction chamber.

If the apparatus is to be sufficiently flexible, however, it will be necessary to provide means for adding additional heat. This may be done by placing the heating coil in the path of the flue gases from the furnace serving to heat the reaction chamber. In this case, the coil is preferably arranged as a bypass so that close temperature control may be had. The feed oil and the hot gases from the reaction chamber 18 are suitably mingled in the evaporator 5 or are mingled in a line and introduced together into the evaporating chamber, in such a way as to afford maximum contact between said gases and said oil, and at the same time provide for sufficient effective evaporating surface and space for the evolved vapors to reach a greater or less degree of equilibrium. This evaporating chamber is preferably also provided with a suitable baffle or baffles of which the object is to prevent the lighter constituents contained in the crude oil feed from reaching the liquid outlet and so contaminating the lubricating oil stock which is continuously drawn off at that point.

The temperature of the liquid in this evaporator is held, in this example, at approximately 400° F. Under the pressure conditions prevailing no aluminum chloride can exist in this chamber except as a vapor. Therefore, all the aluminum chloride will pass through the oil body in the vapor state, will act upon the liquid oil as well as the oil vapor within the evaporating chamber at a temperature substantially below that at which decomposition into lower boiling oils takes place. The sole reaction, then, will be of the nature of purification and saturation. Such heavy reaction products as may result from this reaction may be retained by a suitably designed baffle 23 and withdrawn separately, or may be withdrawn with the lubricating oil stock and settled out in storage.

The mingled oil and aluminum chloride vapors pass from the evaporating chamber through vapor line 6 to the dephlegmator 8. Whatever aluminum chloride is necessary to maintain the continuity of this process may advantageously be added in the vapor state at some point in this line 6. The particular design of the dephlegmating tower is not essential. Its function is to effect good fractionation. Any design which will accomplish this will automatically bring about efficient contact between the oil and aluminum chloride vapors.

This contact serves to purify, i. e., desulphurize and sweeten, the oil. At the same time the temperature is such that no decomposition into lower boiling point oil takes place. All the aluminum chloride is condensed and, incorporated with the refluxed oil, is conveyed to the reaction chamber 18. That portion of the oil which is condensed between the point at which all the aluminum chloride is condensed and the outlet 12 from the tower may be separately removed. This fraction may be returned to the evaporating chamber, it may be cooled and separated as a water-white distillate (by closing valve 14 and opening valve 15 so as to pass the condensate through the condensor and cooler 16), it may be run directly to a still for the production of lamp oil, or it may be conducted with the refluxed oil to the reaction chamber 18 (by closing valve 15 and opening valve 14).

The heavier products condensed in and removed from the tower may be all those having boiling points above 437° F., i. e., all except navy gasoline, or two cuts may be made in the dephlegmating tower, one consisting of gasoline boiling points stock, end point, 350-450° F. and one having the boiling points of lamp oil stock, end point 550-650° F.

In this example the temperature of the liquid in the reaction chamber is preferably above 650° F., and the pressure on the reaction chamber is above 20 pounds. The residuum from the reaction chamber may be a very viscous liquid containing spent aluminum chloride, and may be run directly to a suitable recovery process. In economical operation this residuum may be passed through a liquid heat exchanger in contact with feed oil to the system. If it is desired to run the residuum to coke in the reaction chamber the duration of a run will be limited by the accumulation of such coke. At this temperature (650° F.) part of the refluxed oil will be converted to lower boiling point oil. This converted oil will be completely vaporized as will substantially all of the aluminum chloride reaching the reaction chamber. These oil and aluminum chloride vapors are passed together into the evaporator before which or in which they will be contacted with the incoming oil feed, raising the temperature of this feed to a point at which lighter constituents contained therein will be vaporized. It may be mentioned at this point that aluminum chloride which vaporizes at about 365° F. under a pressure of 1 atmosphere will vaporize at about 405° F. under 2.6 atmospheres, and at about 332° F. under .3 atmosphere. The products of the purifying reaction between the aluminum chloride vapor and liquid oil in the evaporator may be at least partially separated by means of baffles as has been above noted. This residuum may be run to the reaction chamber by connecting the draw-off 31, to the suction side of the pump 28.

The yield of gasoline from this process will be much higher than the normal yield of gasoline from the crude or other oil charged. The actual increase in yield will be dependent upon the manner of operating, particularly the temperature and pressure of the reaction chamber and the amount of refluxing from the tower. The gasoline produced will consist of a full chain of boiling points, the nature of which will depend largely upon the conditions prevailing during the run. If the original charging stock contains gasoline which is deficient in certain boiling points this deficiency may be overcome by the proper adjustment of the cracking process in the reaction chamber. Furthermore, this gasoline will be one of exceptional purity, with very low sulphur content and highly saturated, and will, therefore, require no further refinement. The lubricating oil stock produced will also be one of exceptional quality, and while it will require additional refinement to produce an oil of the proper viscosity and color, it will require very much less refinement than would an oil produced in the ordinary way.

Various changes may be made in the process for the purpose of meeting special conditions. For example, the introduction of aluminum chloride vapor may be made directly into the evaporator, directly into the reaction chamber, or into the dephlegmating tower. If the aluminum chloride is introduced into the reaction chamber it may, if desired, be in the solid form. The residuum from the evaporator may be run with the reflux from the tower to the reaction chamber, and the residual oil from the reaction chamber may be used for the production of lubricating oil stock. In this case, the oil vapors and aluminum chloride vapors from the reaction chamber may be returned directly to the tower or separately condensed. As a further modification of a unit process such as has been described above, I may employ as charging stock a residual oil containing no hydrocarbons boiling below 600° F. In this case, the system is maintained under vacuum, the over-thrown stock will consist of purified lubricating oil fractions, and the refluxed oil from the tower will be converted to low boiling point oils which will be separately removed from the system. The vaporized oil and aluminum chloride from the reaction chamber may pass into the dephlegmating tower, or they may be separately condensed and segregated. The feed stock may be run into the tower at such a point that there will be no danger of carrying over heavy ends and impurities with the gasoline vapors. The so-called lamp oil or water-white cut from the tower may be returned to the evaporator. Anhydrous aluminum chloride has been mentioned as an example of a reagent or catalyst which may be employed in this process. However, various other compounds may be substituted. Among these are other metallic halides, such as the chlorides of iron, zinc, tin, etc.

While the process herein described is well adapted for carrying out the objects of the present invention, it is understood that various modifications and changes may be made without departing from the principles of the invention. The invention includes all such modifications as come within the scope of the appended claims.

I claim:

1. In a process of converting petroleum oils to produce lighter fractions and a lubricating fraction, the steps of contacting a petroleum feed oil containing lighter fractions with vapor from a metallic halide reaction zone in a purification zone so as to purify said feed oil without substantial conversion thereof into lower boiling oils, and to vaporize lighter fractions present in said feed oil; discharging lower boiling oils in vapor state from said purification zone; separately discharging purified heavier fractions from said purification zone; condensing a part of said lower boiling oil vapors discharged from said purification zone, subjecting the condensed lower boiling oils to increased temperature in the presence of metallic halide in a reaction zone so as to convert them into low boiling oils and discharging vapors from said reaction zone into contact with feed oil in said purification zone in cyclic operation of the process.

2. In a process of treating petroleum oils, the steps of: converting a higher boiling point fraction of a petroleum oil with metallic halide in a reaction zone into lower boiling oils; contacting vapors from said reaction zone with a petroleum feed oil in a purifying zone under temperature and pressure conditions insufficient to cause substantial conversion of the feed oil into lower boiling oils; discharging higher boiling fractions in liquid state from said purifying zone; separately discharging lower boiling oil fractions in vapor state from said purifying zone into a reflux zone; introducing metallic halide into such lower boiling oil vapors and into said reflux zone; condensing the metallic halide and higher boiling oil vapors in said reflux zone; discharging uncondensed low boiling oil vapors from said reflux zone, and separately discharging higher boiling oil and metallic halide condensed in said reflux zone from said zone into the reaction zone.

3. In a process of treating petroleum oils, the steps of: converting a higher boiling point fraction of a petroleum oil with metallic halide in a reaction zone at a superatmospheric pressure into lower boiling oils; contacting vapors of metallic halide and lower boiling oils from said reaction zone with a petroleum feed oil in a purifying zone under temperature and pressure conditions insufficient to cause substantial conversion of the feed oil into lower boiling oils; discharging higher boiling petroleum fractions in liquid state from said purifying zone; separately discharging vapors of lower boiling petroleum fractions and metallic halide from said purifying zone into a reflux zone operating at a reduced pressure, condensing metallic halide and a portion of the oil vapors in said reflux zone, discharging uncondensed low boiling oil vapors from said reflux zone, and separately discharging the oil and metallic halide condensed in said reflux zone from said reflux zone into the reaction zone.

4. In a continuous method of treating petroleum oils with metallic halide, the steps of: contacting a crude petroleum oil containing low boiling point fractions with vapors from a metallic halide conversion zone in a purification zone under pressure and temperature conditions adapted to vaporize low boiling point fractions of said oil but insufficient to convert high boiling point fractions of said oil; discharging a relatively high boiling point fraction in liquid form from said purification zone, and separately discharging a low boiling point fraction in vapor form from said purification zone.

5. In a continuous method of treating petroleum oils with metallic halide, the steps of: contacting a relatively high boiling point petroleum oil containing some low boiling point fractions with vapors from a metallic halide conversion zone in a purification zone under pressure and temperature conditions adapted to vaporize low boiling point fractions of said petroleum oil but insufficient to convert high boiling point fractions of said oil; discharging a relatively high boiling point fraction in liquid form from said purification zone, and separately discharging a low boiling point fraction in vapor form from said purification zone.

6. In a continuous method of treating petroleum oils with metallic halide, the steps of: contacting a relatively high boiling point hydrocarbon petroleum oil with vapors of oil and metallic halide from a metallic halide conversion zone in a purification zone under pressure and temperature conditions adapted to vaporize a portion of said hydrocarbon petroleum oil but insufficient to convert said oil to lower boiling point hydrocarbons; discharging a relatively high boiling point fraction in liquid form from said purification zone, and separately discharging a low boiling point fraction in vapor form from said purification zone.

7. A continuous method of treating oils with metallic halide, comprising the steps of: contacting a relatively high boiling point oil with heated vapors from a metallic halide conversion zone under such pressure and temperature conditions as will vaporize a portion of said oil but will not convert said oil to lower boiling point hydrocarbons, discharging from said contacting zone a relatively high boiling point fraction as a liquid, and separately discharging from said contacting zone a relatively low boiling point fraction as a vapor.

8. In a process of treating petroleum oils, the steps of: converting a higher boiling point fraction of a petroleum oil with aluminum chloride in a reaction zone into lower boiling oils; contacting vapors of lower boiling oils and aluminum chloride from said reaction zone with a petroleum feed oil in a purifying zone under temperature and pressure conditions insufficient to cause substantial conversion of the feed oil into lower boiling oils; discharging higher boiling fractions in liquid state from said purifying zone; separately discharging lower boiling oil fractions and aluminum chloride in vapor form from said purifying zone into a reflux zone, adding aluminum chloride in vapor form to said vapors discharged into said reflux zone, condensing aluminum chloride and a portion of the oil vapors in said reflux zone; discharging uncondensed low boiling oil vapors from said reflux zone, and separately discharging higher boiling oil and aluminum chloride condensed in said reflux zone from said zone into the reaction zone.

Signed at San Francisco, California this 17th day of December 1926.

JAMES HAROLD OSMER.